US012293371B2

(12) United States Patent
Twilley et al.

(10) Patent No.: US 12,293,371 B2
(45) Date of Patent: *May 6, 2025

(54) SYSTEMS AND METHODS FOR AUTHENTICATION BASED ON PERSONAL NETWORK

(71) Applicant: Wells Fargo Bank, N.A., San Francisco, CA (US)

(72) Inventors: Tiffany N. Twilley, Foster City, CA (US); Michael Tilaro, San Francisco, CA (US); Jonathan E. Hoveland, Charlotte, NC (US); Sara V. Althoff, Apple Valley, MN (US); Jay M. Bozicevich, Golden Valley, MN (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/407,192

(22) Filed: Jan. 8, 2024

(65) Prior Publication Data

US 2024/0144283 A1    May 2, 2024

Related U.S. Application Data

(63) Continuation of application No. 18/079,215, filed on Dec. 12, 2022, now Pat. No. 11,869,010, which is a
(Continued)

(51) Int. Cl.
*G06Q 20/40* (2012.01)
*G06Q 20/36* (2012.01)
*G06Q 20/42* (2012.01)

(52) U.S. Cl.
CPC ......... *G06Q 20/4016* (2013.01); *G06Q 20/36* (2013.01); *G06Q 20/409* (2013.01); *G06Q 20/42* (2013.01)

(58) Field of Classification Search
None
See application file for complete search history.

(56) References Cited

U.S. PATENT DOCUMENTS 7,503,489 B2    3/2009   Heffez et al.
8,078,538 B1    12/2011  Buch et al.
(Continued)

FOREIGN PATENT DOCUMENTS

WO   WO-2005/073934 A1   8/2005
WO   WO-2012/030163 A2   3/2012
WO   WO-2015/052676 A1   4/2015

OTHER PUBLICATIONS

M. Salajegheh, B. Priyantha and J. Liu, "Unleashing the Wild Card for mobile payment," 2014 IEEE International Conference on Pervasive Computing and Communications (PerCom), Budapest, Hungary, 2014, pp. 121-129. (Year: 2014).*
(Continued)

*Primary Examiner* — Mohammad Z Shaikh
(74) *Attorney, Agent, or Firm* — Foley & Lardner LLP

(57) ABSTRACT

A financial institution computing system includes a network circuit exchanging information over a network, a customer database storing financial information, and a transaction circuit. The transaction circuit receives a transaction request associated with a user computing device. The transaction request specifies a financial account. The transaction circuit receives payment card location information indicative of a location of a payment card with respect to the user computing device. The payment card location information indicates that the payment card is within a threshold distance of the user computing device. The transaction circuit authenticates the transaction request using the payment card location information and by determining whether the payment card is associated with an authorized user of the financial account. The transaction circuit authorizes the transaction request
(Continued)

based on whether the transaction request is authenticated and transmits a confirmation to a transaction terminal over the network via the network circuit.

20 Claims, 4 Drawing Sheets

Related U.S. Application Data continuation of application No. 17/220,059, filed on Apr. 1, 2021, now Pat. No. 11,526,890, which is a continuation of application No. 15/013,397, filed on Feb. 2, 2016, now Pat. No. 10,977,652.

(56) References Cited

U.S. PATENT DOCUMENTS

| | | | |
|---|---|---|---|
| 8,166,068 B2* | 4/2012 | Stevens | G06Q 20/40 705/64 |
| 8,365,988 B1 | 2/2013 | Medina et al. | |
| 8,369,846 B2 | 2/2013 | Rosenblatt | |
| 8,615,465 B2* | 12/2013 | Boutcher | G06Q 20/3224 705/39 |
| 9,026,462 B2 | 5/2015 | Lin et al. | |
| 9,317,511 B2 | 4/2016 | Kanfi | |
| 9,317,847 B2* | 4/2016 | Candelore | G06Q 20/325 |
| 9,331,994 B2 | 5/2016 | Grigg et al. | |
| 9,558,488 B2* | 1/2017 | Candelore | G06Q 20/34 |
| 9,697,511 B2* | 7/2017 | Naccache | G06Q 20/40 |
| 10,387,862 B2* | 8/2019 | Laracey | G06Q 20/10 |
| 10,540,729 B1* | 1/2020 | Maeng | H04W 4/02 |
| 10,977,652 B1* | 4/2021 | Twilley | G06Q 20/36 |
| 11,526,890 B1* | 12/2022 | Twilley | G06Q 20/36 |
| 11,869,010 B1* | 1/2024 | Twilley | G06Q 20/409 |
| 2003/0009422 A1 | 1/2003 | Gopalan | |
| 2004/0038690 A1 | 2/2004 | Lee et al. | |
| 2004/0254868 A1* | 12/2004 | Kirkland | G06Q 20/105 705/35 |
| 2007/0106897 A1 | 5/2007 | Kulakowski | |
| 2009/0104888 A1* | 4/2009 | Cox | G06Q 20/40 455/410 |
| 2010/0082485 A1 | 4/2010 | Lin et al. | |
| 2010/0082487 A1* | 4/2010 | Nelsen | G06Q 20/351 705/44 |
| 2010/0102122 A1* | 4/2010 | Skowronek | G06Q 20/3278 235/492 |
| 2010/0260388 A1 | 10/2010 | Garrett et al. | |
| 2012/0023024 A1* | 1/2012 | Evans | G06Q 20/3672 705/41 |
| 2012/0197787 A1 | 8/2012 | Grigg et al. | |
| 2012/0209773 A1* | 8/2012 | Ranganathan | G06Q 20/40 705/44 |
| 2012/0244885 A1 | 9/2012 | Hefetz | |
| 2012/0290376 A1* | 11/2012 | Dryer | G06Q 20/385 705/14.23 |
| 2013/0036048 A1* | 2/2013 | Campos | G06Q 20/16 705/41 |
| 2013/0109307 A1 | 5/2013 | Reisgies et al. | |
| 2013/0110658 A1 | 5/2013 | Lyman et al. | |
| 2013/0152185 A1* | 6/2013 | Singh | G06Q 20/36 726/9 |
| 2013/0159080 A1* | 6/2013 | Wu | G06Q 20/36 705/16 |
| 2013/0197998 A1 | 8/2013 | Buhrmann et al. | |
| 2013/0246260 A1* | 9/2013 | Barten | G06Q 30/06 705/41 |
| 2013/0317928 A1* | 11/2013 | Laracey | G06Q 20/3552 705/41 |
| 2013/0346223 A1* | 12/2013 | Prabhu | G06Q 20/3223 705/17 |
| 2014/0019352 A1* | 1/2014 | Shrivastava | G06Q 20/326 705/41 |
| 2014/0045458 A1 | 2/2014 | Beilis et al. | |
| 2014/0138435 A1* | 5/2014 | Khalid | G06Q 20/227 235/380 |
| 2014/0180777 A1 | 6/2014 | Moshrefi et al. | |
| 2014/0214673 A1* | 7/2014 | Baca | G06Q 20/0855 705/44 |
| 2014/0214674 A1* | 7/2014 | Narula | G06Q 20/4016 705/44 |
| 2014/0214764 A1* | 7/2014 | Robbin | G06F 16/182 707/634 |
| 2014/0244506 A1 | 8/2014 | Gramling | |
| 2014/0344153 A1 | 11/2014 | Raj et al. | |
| 2015/0004934 A1* | 1/2015 | Qian | H04W 12/06 455/411 |
| 2015/0032626 A1* | 1/2015 | Dill | H04L 9/32 705/44 |
| 2015/0058146 A1* | 2/2015 | Gaddam | G06Q 20/322 705/39 |
| 2015/0069126 A1* | 3/2015 | Leon | G06K 19/06206 235/492 |
| 2015/0084745 A1 | 3/2015 | Hertz et al. | |
| 2015/0100442 A1* | 4/2015 | Van Heerden | G06Q 20/327 705/16 |
| 2015/0227903 A1* | 8/2015 | Votaw | G06Q 20/108 705/42 |
| 2015/0227934 A1 | 8/2015 | Chauhan | |
| 2015/0248664 A1* | 9/2015 | Makhdumi | G06Q 20/3274 235/380 |
| 2015/0248670 A1* | 9/2015 | Langus | G06Q 20/409 705/41 |
| 2015/0294304 A1* | 10/2015 | Donnellan | G06Q 20/3278 705/44 |
| 2015/0302411 A1* | 10/2015 | Bondesen | G06Q 20/3224 705/72 |
| 2015/0319161 A1* | 11/2015 | Dimmick | H04W 12/06 726/4 |
| 2015/0348042 A1* | 12/2015 | Jivraj | G06Q 20/326 705/44 |
| 2016/0092868 A1* | 3/2016 | Salama | G06Q 20/3829 705/41 |
| 2016/0117660 A1* | 4/2016 | Prakash | G06Q 20/202 705/14.64 |
| 2016/0125388 A1* | 5/2016 | Gao | G06Q 20/0855 705/73 |
| 2016/0125396 A1* | 5/2016 | Brickell | G06Q 20/382 705/67 |
| 2016/0162883 A1* | 6/2016 | Liscia | G06Q 20/363 705/71 |
| 2016/0171499 A1* | 6/2016 | Meredith | G06Q 20/4016 705/44 |
| 2016/0173483 A1 | 6/2016 | Wong et al. | |
| 2016/0192123 A1* | 6/2016 | Lim | G06Q 20/227 455/41.1 |
| 2016/0224977 A1 | 8/2016 | Sabba et al. | |
| 2016/0267467 A1 | 9/2016 | Rutherford et al. | |
| 2016/0292666 A1 | 10/2016 | Chauhan | |
| 2016/0307186 A1* | 10/2016 | Noë | G06Q 20/3278 |
| 2016/0350746 A1 | 12/2016 | Johnson | |
| 2016/0364716 A1 | 12/2016 | Bakshi et al. | |
| 2017/0011389 A1 | 1/2017 | McCandless et al. | |
| 2017/0032362 A1 | 2/2017 | Lahkar et al. | |
| 2017/0083906 A1 | 3/2017 | Gaur et al. | |
| 2017/0140350 A1 | 5/2017 | Jamkhedkar et al. | |
| 2018/0082303 A1 | 3/2018 | Chan-Bauza et al. | |

OTHER PUBLICATIONS

Arnfield, Robin,"MobileWallets101", MobilePayments Today, 2015, pp. 1-23. (Year: 2015).

Chae,SangUn, Johannes&Hedman,Jonas, "Business Models for NFC based payments", Journal of Business Models; 2015, vol. 3, No. 1, pp. 29-48. (Year: 2015).

Johannes Sang Un Chae et al., "Business Models for NFC based mobile payments", Journal of Business Models, (2015), vol. 3, No. 1, pp. 29-48.

(56) References Cited

OTHER PUBLICATIONS

M. Salajegheh, B. Priyantha and J. Liu, "Unleashing the Wild Card for mobile payment," 2014 IEEE International Conference on Pervasive Computing and Communications (PerCom), 2014, pp. 121-129, (Year: 2014).
Me et al., Mobile Local Macropayments: Security and Prototyping, IEEE Pervasive Computing, vol. 5, No. 4, Oct.-Dec. 2006, 7 pages.

* cited by examiner

SYSTEMS AND METHODS FOR AUTHENTICATION BASED ON PERSONAL NETWORK

CROSS-REFERENCE TO RELATED APPLICATIONS

This application is a continuation of U.S. patent application Ser. No. 18/079,215 filed Dec. 12, 2022, which is a continuation of U.S. patent application Ser. No. 17/220,059 filed Apr. 1, 2021, which is a continuation of U.S. patent application Ser. No. 15/013,397 filed Feb. 2, 2016, each of which is incorporated herein by reference in its entirety.

BACKGROUND

Many financial institution customers are able to complete various financial transactions using their mobile devices. Customers may set up their mobile devices to organize and selectively exchange payment information with transaction terminals in the absence of physical payment cards. However, customers may nonetheless carry physical payment cards with them and possess physical payment cards even when conducting a transaction where a physical payment card is not provided to a merchant or where a physical payment card does not interface with a transaction terminal. For example, the customer may conduct a transaction using an application stored on their mobile device, such as a "mobile wallet" offered by financial institutions or other third party software developers. Such mobile wallet transactions may require additional authentication information before initiating a given transaction, such as unlocking the mobile device, entering a personal identification number into the mobile device, and so on.

SUMMARY

One embodiment relates to a financial institution computing system. The system includes a network circuit enabling the financial institution computing system to exchange information over a network. The financial institution computing system further includes a customer database storing financial information for a plurality of customers, a user activity circuit, and a transaction circuit. The transaction circuit is configured to receive, over the network via the network circuit, a transaction request associated with a user computing device. The transaction request specifies a financial account. The transaction circuit is further configured to receive, over the network via the network circuit, payment card location information indicative of a location of a payment card with respect to the user computing device. The payment card location information indicates that the payment card is within a threshold distance of the user computing device. The transaction circuit is further configured to authenticate, using the payment card location information and the customer database, the transaction request by determining whether the payment card is associated with an authorized user of the financial account specified in the transaction request. The transaction circuit is further configured to authorize, based at least in part on whether the transaction request is authenticated and information in the customer database, the transaction request. The transaction circuit is further configured to transmit a confirmation to a transaction terminal over the network via the network circuit.

Another embodiment relates to a method of authorizing a transaction request performed by a financial institution computing system. The method includes receiving, by a transaction circuit over a network via a network circuit, a transaction request associated with a user computing device. The transaction request specifies a financial account. The method further includes receiving, by the transaction circuit over the network via the network circuit, payment card location information indicative of a location of a payment card with respect to the user computing device. The payment card location information indicates that the payment card is within a threshold distance of the user computing device. The method further includes authenticating, by the transaction circuit, using the payment card location information and a customer database storing financial information for a plurality of customers, the transaction request by determining whether the payment card is associated with an authorized user of the financial account specified in the transaction request. The method further includes authorizing, by the transaction circuit, based at least in part on whether the transaction request is authenticated and information in the customer database, the transaction request. The method further includes transmitting, by the transaction circuit via the network circuit, a confirmation to a transaction terminal over the network.

Another embodiment relates to non-transitory computer readable media having computer-executable instructions embodied therein that, when executed by a transaction circuit of a financial institution computing system, causes the financial institution computing system to perform operations to authorize transaction requests. The operations include receiving, over a network via a network circuit, a transaction request associated with a user computing device. The transaction request specifies a financial account. The operations further include receiving, over the network via the network circuit, payment card location information indicative of a location of a payment card with respect to the user computing device. The payment card location information indicates that the payment card is within a threshold distance of the user computing device. The operations further include authenticating, using the payment card location information and a customer database storing financial information for a plurality of customers, the transaction request by determining whether the payment card is associated with an authorized user of the financial account specified in the transaction request. The operations further include authorizing, based at least in part on whether the transaction request is authenticated and information in the customer database, the transaction request. The operations further include transmitting a confirmation to a transaction terminal over the network via the network circuit.

DETAILED DESCRIPTION

Figure 1:
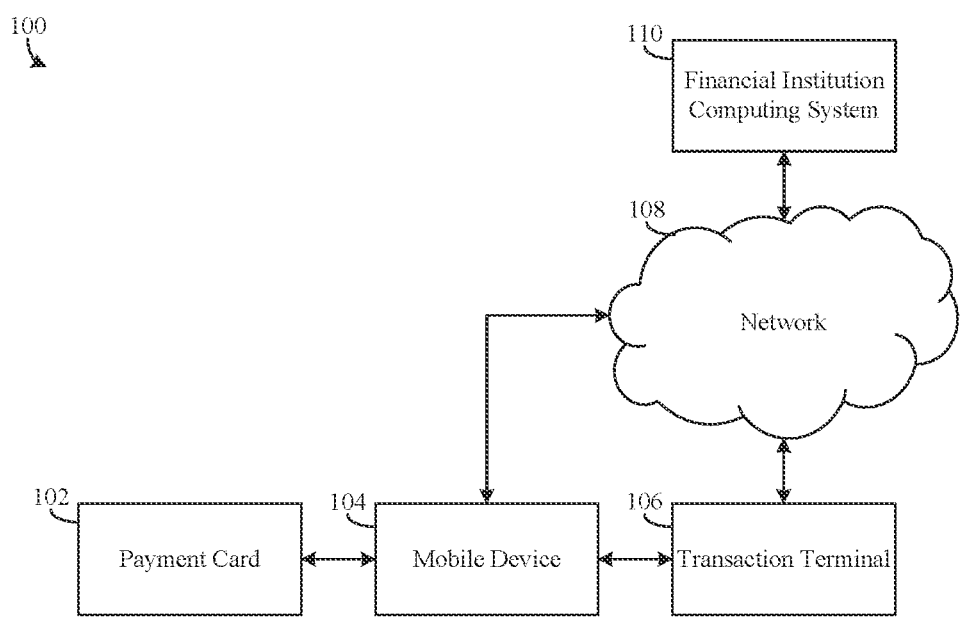
FIG. 1 is a block diagram illustrating a transaction request authorizing system including a payment card, according to an example embodiment.

Before turning to the figures which illustrate example embodiments, it should be understood that the application is not limited to the details or methodology set forth in the following description or illustrated in the figures. It should also be understood that the phraseology and terminology employed herein is for the purpose of description only and should not be regarded as limiting. For example, the embodiments of systems and methods discussed herein may be relevant to any of a variety of circumstances where authenticating a transaction, device, or person may be useful.

Embodiments of systems and methods of authorizing transactions based on a card network are discussed below. A financial institution computing system receives transaction information from a customer mobile device indicating whether a personal card (e.g., a payment card) that is physically distinct from the mobile device is carried on the person of a customer when the customer initiates a transaction. In various embodiments, both the mobile device and the payment card belong to and are associated with an authorized user of a financial account. The financial institution computing system authorizes the transaction if the payment card is being carried by the customer, even if the payment card is not the source of funds being used in the transaction, and transmits a confirmation to the transaction terminal indicating that the transaction request has been authorized. While the examples described herein make reference to a payment card, it will be appreciated that the systems and methods disclosed may authenticate and authorize transactions based on the presence of other types of cards that may be detected by a user computing device and not used in the transaction other than for purposes of authentication and authorization.

The embodiments and implementations of the systems and methods disclosed herein improve current transaction systems and computing systems for authenticating payment transactions by authenticating transaction requests by determining whether a payment card that is physically distinct from the mobile device is carried on the person of a customer when the customer initiates a transaction. These systems, methods, and computer implementations improve the accuracy of authentication procedures by ensuring that a payment card of an authorized user is linked to or detected by the mobile device and in the possession of the customer but not necessarily being used to initiate or provide funds for the transaction. As such, the systems, methods, and computer implementations disclosed herein improve the functioning of transaction systems and computing systems for authenticating payment transactions by providing functionalities that are novel and non-obvious improvements over current systems.

The embodiments discussed herein may be relevant to any of a variety of circumstances where an exchange of payment credentials may be useful. For example, in one embodiment, authenticating mobile wallet transaction requests by determining whether a payment card is present or carried by the customer may be used in the context of a purchase transaction at a brick and mortar retail establishment. In another embodiment, the payment card may be used in the context of electronic payment transactions (e.g., person-to-person ("P2P") transactions, online shopping, etc.).

Referring to FIG. 1, a block diagram illustrating a transaction request authorizing system 100 is shown according to an example embodiment. The transaction request authorizing system 100 includes a payment card 102, a mobile device 104, a transaction terminal 106, and a financial institution computing system 110. Various components of the system 100 may be configured to communicate with each other over a network 108. The network 108 is a data exchange medium, which may include wireless networks (e.g., cellular networks, Bluetooth®, WiFi, Zigbee®, etc.), wired networks (e.g., Ethernet, DSL, cable, fiber-based, etc.), or a combination thereof. In some embodiments, the network 108 includes the internet.

The payment card 102 is a small active or passive card system configured to communicate with or be detected by the mobile device 104 for various customer authentication procedures. The card system may be integrated into a payment card, such as a traditional credit card or debit card. In some embodiments, the card system is integrated into a smart payment card. For example, the smart payment card may approximately have the form factor of a traditional credit card (e.g., a card about 75 mm<length<95 mm; 45 mm<width<60 mm; preferably, length=85.6 mm, width=53.98 mm; and including a readable interface such as a magnetic strip, chip, and/or circuit) but may have a processor, microprocessor, microchip memory, and/or a display (e.g., utilizing E Ink technology). For example, the smart payment card may be configured to display a variety of information, including information for a variety of payment cards associated with the customer. In some embodiments, the microchip is an EMV-enabled chip, such as those compatible with Europay®, MasterCard®, and Visa®. In some embodiments, the smart payment card may include a portable power source, for example a replaceable or rechargeable battery.

In some embodiments, the payment card 102 is used as a payment source for the transaction request. In other embodiments, the payment card 102 is not used as a payment source for the transaction request. For example, a first payment card may be in the possession of and carried by an authorized user of a financial account, and the authorized user may initiate a transaction using the mobile device 104 where the source of payment for the transaction is a second payment card having information stored in a mobile wallet stored on the mobile device 104. The first and second payment cards may be associated with a financial institution of the financial institution computing system 110 or another financial institution. For example, a first payment card associated with a first financial institution may be used to authenticate a transaction where a second payment card associated with a second financial institution is used as a source of payment for the transaction.

The payment card 102 is configured to communicate its presence to the mobile device 104, or be detected by the mobile device 104, over relatively short distances (e.g., within a few inches, within a few inches to a couple feet, or within a few yards). The payment card 102 communicates with, or is detected by, the mobile device 104 wirelessly using any of a variety of near field communication technologies (e.g., via Bluetooth™, RFID, NFC, etc.).

The mobile device 104 is a computing system associated with an authorized user of one or more financial accounts at the financial institution. The mobile device 104 includes one or more processors and non-transitory storage mediums housing one or more logics configured to allow the mobile device 104 to exchange data over the network 108, execute software applications, access websites, generate graphical user interfaces, and perform other similar operations. Examples of the mobile device 104 include smartphones, tablets, wearable computing devices such as smartwatches, and the like. Although both may be computing devices, the mobile device 104 is separate and physically distinct from the payment card 102 (e.g., each of the payment card 102 and the mobile device 104 may be carried by a user independently of each other). In some embodiments, the mobile device 104 may communicate with an additional device used to authenticate the user such as a smartwatch, a pedometer, a key fob, and the like. As such, the mobile device 104 may be configured to cooperate with the additional device to prepare and transmit transaction information that is ultimately received at the financial institution computing system 110.

The mobile device 104 is configured to communicate with the payment card 102 to prepare and transmit transaction information that is ultimately received at the financial institution computing system 110. In some embodiments, the mobile device 104 is configured to create a personal area network that includes the mobile device 104 and one or more payment cards 102 of the user within a wireless range of the mobile device 104. In some embodiments, the mobile device 104 is configured to automatically detect the presence of payment cards 102 within an area around the mobile device 104. For example, the mobile device 104 may be configured to determine whether a payment card 102 is in the possession of a user based on detecting a payment card having a microchip within a few inches or a few feet of the mobile device 104. In some embodiments, the mobile device 104 may continuously or intermittently communicate with or detect payment cards 102 within range of the mobile device 104, such that the mobile device 104 may determine whether the user is in possession of the payment card 102 before a transaction is initiated or a transaction request is communicated to the financial institution computing system 110. In some embodiments, the mobile device 104 communicates with or detects payment cards 102 within range of the mobile device 104 after a transaction is initiated or a transaction request is communicated to the financial institution computing system 110. The mobile device 104 may be configured to determine a location of the payment card 102 with respect to the mobile device 104, including a distance that the payment card 102 is from the mobile device 104.

The mobile device 104 is configured to communicate with the financial institution computing system 110 to provide payment card location information to the financial institution computing system 110. In some embodiments, the financial institution computing system 110 requests the payment card location information from the mobile device 104. In some embodiments, the mobile device 104 automatically provides payment card location information to the financial institution computing system 110 (e.g., continuously, intermittently, based on a transaction being initiated, etc.). In some embodiments, the mobile device 104 authenticates the user based on the presence of the payment card 102. For example, in some embodiments, a mobile wallet application running on the mobile device 104 may first authenticate the user of the mobile device 104 based on the user possessing the payment card 102 before enabling a transaction request to be sent to the financial institution computing system 110. As such, the mobile device 104 may first authenticate the transaction request before providing the request to the financial institution computing system 110, which then performs a second level of authentication based on the payment card information or based on other factors (e.g., other anti-fraud factors, whether the user has sufficient funds, etc.). In some embodiments, the financial institution computing system 110 authenticates the user based on the presence of the payment card 102, as will be further discussed below.

In some embodiments, the mobile device 104 is configured to manage at least one payment credential corresponding to a method of payment associated with a customer. For example, the mobile device 104 may include one or more circuits configured to provide the customer with a mobile wallet functionality, as discussed in more detail with respect to FIG. 2, below. In preparing transaction information, the mobile device may include payment credentials corresponding to a method of payment and an identification code (e.g., the customer ID code). The mobile device 104 may then transmit the transaction information to the transaction terminal 106.

The transaction terminal 106 is a computing system associated with an individual or entity with whom a customer seeks to transact (e.g., merchants, service providers, etc.). The transaction terminal 106 is configured to receive transaction information from the mobile device 104 and create a transaction request. The transaction request is a request for the financial institution computing system 110 to withdraw a designated sum of funds from a financial account corresponding to the transaction information and deposit the designated sum of funds into an account associated with the requesting party (e.g., the individual or entity associated with the transaction terminal 106). Examples of the transaction terminal 106 include, merchant point of sale terminals, ATMs, one or more servers configured to process online or P2P transactions, and so on.

The financial institution computing system 110 is a computing system at a financial institution that is capable of maintaining customer accounts (e.g., payment card accounts) and databases of customer information. In the context of the present disclosure, the financial institution can include commercial or private banks, credit unions, investment brokerages, or the like. In response to a received transaction request, the financial institution computing system 110 may be configured to authenticate the transaction information, and authorize the transaction request (e.g., determining whether the identified financial account contains sufficient funds, and transferring the designated sum of funds to an identified account). The financial institution computing system 110 may be configured to transmit a message back to the transaction terminal 106 indicating whether the transaction request was granted or denied.

In operation according to one embodiment, a customer is in possession of both the payment card 102 (e.g., a typical credit card) and the mobile device 104 (e.g., a smartphone). The customer may walk into a brick and mortar retail establishment, identify an item for purchase, and approach the transaction terminal 106. The customer allows the mobile device 104 to communicate with the transaction terminal 106 (e.g., by bringing the mobile device 104 within range of an NFC reader at the transaction terminal 106). While in communication with the transaction terminal 106, the mobile device 104 may also detect the presence of the payment card 102. The mobile device 104 then includes a customer approved method of payment (e.g., a credit card) and payment card location information indicative of a location of the payment card 102 with respect to the mobile device 104, and transmits the transaction information to the transaction terminal 106. The transaction terminal 106 generates a transaction request that includes the transaction information (i.e., including the payment card location information), and transmits the transaction request to the financial institution computing system 110 over the network 108. The financial institution computing system 110 receives and authenticates the transaction request using the included payment card location information, performs any of a variety of other financial and/or fraud checks (e.g., available balances, transaction histories, personal identification number ("PIN") verification, etc.), and authorizes the requested transaction. The financial institution computing system 110 then transmits a confirmation back to the transaction terminal 106 over the network 108. Additional details and functions of the system 100 are discussed below.

Figure 2:
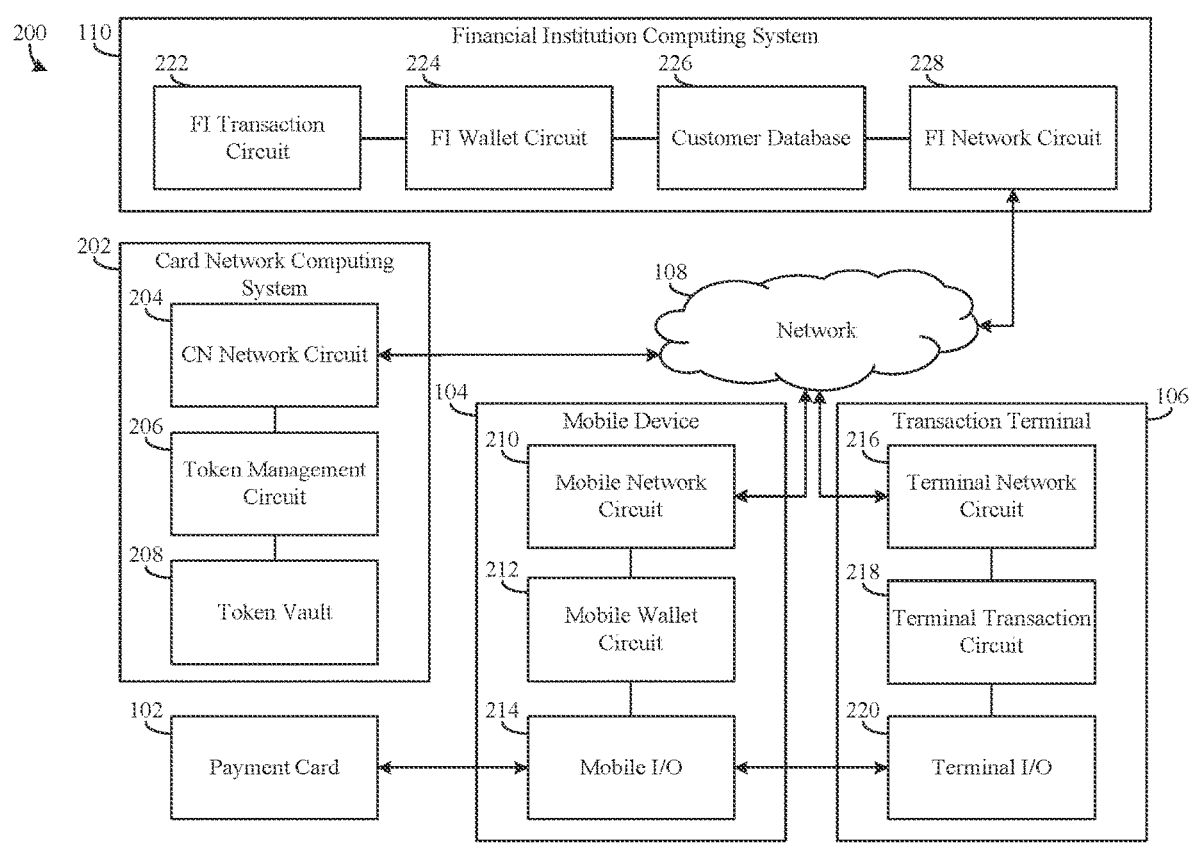
FIG. 2 is a block diagram illustrating an example embodiment of the transaction request authorizing system shown in FIG. 1.

Referring now to FIG. 2, a block diagram of a transaction system 200 is shown as a more detailed embodiment of the system 100 and further including a card network computing system 202, the payment card 102, the mobile device 104, the transaction terminal 106, the network 108, and the financial institution computing system 110 of FIG. 1.

The card network computing system 202 is a computing system associated with a card network. Examples of card networks include Visa®, MasterCard®, etc. The card network computing system 202 performs operations associated with the generation and issuance of payment card tokens. Payment card tokens are surrogate values that replace the primary account number ("PAN") associated with a payment card, such as a credit card, debit card, ATM card, stored value card, etc. Payment card tokens can pass basic validation rules of an account number. Hence, in the case of a debit card, the payment card token for a given debit card "looks like" a real debit card number (e.g., a sixteen-digit number), but in fact is only a token. As part of a token generation process, steps are taken such that the generated payment card token does not have the same value as or otherwise conflicts with a real PAN (e.g., a real debit card number). A given payment card token may be provisioned to various locations for use in various types of scenarios, including ATMs for performing various financial operations, storage at a mobile device (e.g., a smartphone) for in-person or on-line transactions with a merchant, and so on.

The card network computing system 202 is a computing system associated with a card network. Examples of card networks include Visa®, MasterCard®, etc. The card network computing system 202 performs operations associated with the generation and issuance of payment card tokens. Payment card tokens are surrogate values that replace the primary account number ("PAN") associated with a payment card, such as a credit card, debit card, ATM card, stored value card, etc. Payment card tokens may pass basic validation rules of an account number. For example, in the case of a debit card, the payment card token for a given debit card may "look like" a real debit card number (e.g., a sixteen-digit number), but in fact is only a token. As part of a token generation process, steps are taken such that the generated payment card token does not have the same value as or otherwise conflicts with a real PAN (e.g., a real debit card number). A given payment card token may be provisioned to various locations for use in various types of scenarios, including ATMs for performing various financial operations, storage at a mobile device (e.g., a smartphone) for in-person or on-line transactions with a merchant, and so on.

The card network computing system 202 includes a card network ("CN") computing system network circuit 204, a token management circuit 206, and a token 208 218. The CN network circuit 204 enables the card network computing system 202 to exchange data over the network 108. As such, the CN network circuit 204 allows the card network computing system 202 to exchange data to remote computing devices (e.g., the mobile device 104, the transaction terminal 106, the financial institution computing system 110, etc.).

The token vault 208 is a storage medium maintaining established payment card tokens-to-PAN mapping data. The token vault 208 may include non-transient data storage mediums (e.g., local disc or flash-based hard drives, local network servers, and the like) or remote data storage facilities (e.g., cloud servers).

The token management circuit 206 is configured to provision and manage tokens. In one embodiment, the token management circuit 206 may generate a new unique code to be provisioned as a token, associate the token with a PAN, and store corresponding mapping data in the token vault 208. In another embodiment, the token management circuit 206 may replace tokens as well as activate and deactivate tokens, and update the token vault 208 accordingly. The token management circuit 206 may also be configured to associate permissions with each token, thereby allowing or disallowing the transmission or use of data associated with a given token. The token management circuit 206 may also cause one or more tokens to be disposed on the mobile device 104, for example as discussed with respect to the mobile wallet circuit 212 below.

The token vault 208 is a storage medium maintaining established payment card tokens-to-PAN mapping data. The token vault 208 may include non-transient data storage mediums (e.g., local disc or flash-based hard drives, local network servers, and the like) or remote data storage facilities (e.g., cloud servers).

In the system 200, the mobile device 104 includes a mobile network circuit 210 enabling the mobile device 104 to exchange data over the network 108, mobile wallet circuit 212, and a mobile input/output device ("I/O") 214. The mobile I/O 214 includes hardware and associated logics configured to enable the mobile device 104 to exchange information with a customer, the payment card 102, and the transaction terminal 106 (e.g., via a corresponding terminal I/O 220, as discussed below). An input aspect of the mobile I/O 214 allows the customer to provide information to the mobile device 104, and can include, for example, a mechanical keyboard, a touchscreen, a microphone, a camera, a fingerprint scanner, any user input device engageable to the mobile device 104 via a USB, serial cable, Ethernet cable, and so on. In turn, an output aspect of the mobile I/O 214 allows the customer to receive information from the mobile device 104, and can include, for example, a digital display, a speaker, illuminating icons, LEDs, and so on. Further, the mobile I/O 214 may be configured to include assemblies that serve both input and output functions, allowing the payment card 102 and the transaction terminal 106 to exchange information with the mobile device 104. Such assemblies include, for example, radio frequency transceivers (e.g., RF or NFC-based transceivers) and other short range wireless transceivers (e.g., Bluetooth™, laser-based data transmitters, etc.).

The mobile I/O 214 is configured to create a personal area network that includes the mobile device 104 and one or more payment cards 102 of the user within a wireless range of the mobile device 104. For example, the mobile I/O 214 may automatically detect the presence of payment cards 102 within an area around the mobile device 104 such that the mobile I/O 214 is able to determine whether a payment card 102 is in the possession of a user based on detecting a payment card having a microchip within a few inches or a few feet of the mobile device 104. In some embodiments, the mobile I/O 214 continuously or intermittently communicates with or detects payment cards 102 within range of the mobile device. For example, the mobile I/O 214 may be configured to search for or receive signals from the payment card 102 before or after a transaction is initiated.

The mobile wallet circuit 212 is a circuit configured to provide a user with a mobile wallet functionality. The mobile wallet circuit 212 may provide an interface configured to receive and display mobile web pages (e.g., web pages provided on the mobile I/O 214 prompting the user to provide information to create an account, web pages displaying account balance information, past transactions, and so on) received from a mobile wallet bank computer system (e.g., an FI wallet circuit 224 at the financial institution computing system 110 as discussed below, or a third party wallet provider such as ApplePay™ or Android Pay™) over the network 108 via the mobile network circuit 210.

While setting up a mobile wallet account, the mobile wallet circuit 212 may receive, organize, and store payment credentials (e.g., payment tokens) from a payment card (e.g., from local storage disposed on a credit card, debit card, gift card, etc., for example via functionalities available through EMV smart cards such as Visa payWave™, Mastercard PayPass™, and American Express ExpressPay™) or the card network computing system 202 over the network 108. The mobile wallet circuit 212 may then allow users to choose any one of the accounts for transferring funds, for example to a merchant for goods or services. A user may also select a default account that the mobile wallet circuit 212 will use to make payments. The customer may alternatively use account selection logic at the mobile wallet circuit 212 to select a specific account to use for each transaction.

In some embodiments, the mobile wallet circuit 212 is configured to cooperate with the mobile I/O 214 to prepare transaction information. For example, prior to initiating a transaction, the mobile wallet circuit 212 may be configured to authenticate the user of the mobile device 104 based on whether the user is in possession of the payment card 102. The mobile wallet circuit 212 may then prepare transaction information to include in a customer payment token. The mobile wallet circuit 212 may subsequently transmit the transaction information to the transaction terminal 106 via the mobile I/O 214.

The transaction terminal 106 includes a terminal network circuit 216 enabling the transaction terminal 106 to exchange data over the network 108, a terminal transaction circuit 218, and a terminal I/O 220. Similar to the mobile I/O 214, the terminal I/O 220 includes hardware and associated logics configured to enable the transaction terminal 106 to exchange information with a customer, the mobile device 104 (e.g., via corresponding hardware and logics at the mobile I/O 214), and a terminal attendant (e.g., a store clerk), if any. The terminal I/O 220 may include any of the input, output, and input/output functionalities discussed with respect to the mobile I/O 214, above.

The terminal transaction circuit 218 is configured to receive transaction information (e.g., including a payment token) from the mobile device 104 via the terminal I/O 220, and assemble corresponding transaction requests. The terminal transaction circuit 218 determines a total transaction amount for a payment transaction (e.g., total price of specified products and/or services, plus sales tax, other fees, etc.), bundles the total with the transaction information to make a transaction request, and transmits the transaction request to the financial institution computing system 110 over the network 108 via the terminal network circuit 216.

The financial institution computing system 110 includes a financial institution ("FI") transaction circuit 222, an FI wallet circuit 224, a customer database 226, and an FI network circuit 228 enabling the financial institution computing system 110 to exchange data over the network 108.

The customer database 226 allows the financial institution computing system 110 to retrievably store customer information relating to the various operations discussed herein, and may include non-transient data storage mediums (e.g., local disc or flash-based hard drives, local network servers, and the like) or remote data storage facilities (e.g., cloud servers). The customer database 226 includes personal customer information (e.g., names, addresses, phone numbers, and so on), identification information (e.g., driver's license numbers, standard biometric data, and so on), and customer financial information (e.g., token information, account numbers, account balances, available credit, credit history, transaction histories, and so on). The customer database 226 includes information relating to a plurality of users who are authorized to make transactions from a plurality of financial accounts (e.g., credit card accounts, checking accounts, etc.). Authorized users may include account owners, or other individuals designated as authorized users by a respective account owner. The information relating to the plurality of financial accounts may include information for a financial account used as a payment source in a transaction or for a financial account not used as a payment source in a transaction. The information may include information for a financial account associated with a different financial institution than the financial institution that the financial institution computing system 110 is associated with. For example, the customer database 226 may include information for a first credit card of the customer and information for a second credit card of the customer, where the first credit card is detected by the mobile device 104 and used to authenticate the transaction request but the second credit card is used as a source of funds for the transaction.

In some embodiments, the FI wallet circuit 224 enables or otherwise supplements the operation of the mobile wallet circuit 212. In some embodiments, the FI wallet circuit 224 is configured to communicate with the mobile wallet circuit 212 over the network 108 (e.g., via respective network circuits 228, 210). A customer may establish the mobile wallet circuit 212 on the mobile device 104 and set up a mobile wallet account. In one embodiment, the customer may then manually provide a PAN to the mobile wallet circuit 212 via the mobile I/O 214, and the mobile wallet circuit 212 may transmit the PAN to the FI wallet circuit 224 over the network 108 (e.g., via respective network circuits 210, 228). The FI wallet circuit 224 may then route the PAN to the token management circuit 206 over the network 108 for tokenization, receive a payment token in return, and transmit the payment token back to the mobile wallet circuit 212. In another embodiment, the FI wallet circuit 224 automatically tokenizes PAN information associated with the customer in the customer database 226. In such an embodiment, after the customer sets up the mobile wallet account, the FI wallet circuit 224 may provide tokens corresponding to one or more financial accounts of the customer to the mobile wallet circuit 212. The mobile wallet circuit 212 may then include the payment token in transaction information that is sent as part of transaction requests to the financial institution computing system 110. The FI wallet circuit 224 may also cooperate with the mobile wallet circuit 212 and the token management circuit 206 to manage token permissions, token life cycles, etc.

The FI transaction circuit 222 is configured to facilitate transactions involving the payment card 102. The FI transaction circuit 222 may receive a transaction request from the transaction terminal 106 over the network 108 via the FI network circuit 228. In some embodiments, the FI transaction circuit 222 receives the transaction request from the card network computing system 202 (e.g., where payment tokens are used). The FI transaction circuit 222 further receives, over the network 108 via the FI network circuit 228, payment card location information indicative of a location of the payment card 102 with respect to the mobile device 104. The payment card location information indicates that the payment card 102 is within a threshold distance of the mobile device 104. In some embodiments, the FI transaction circuit 222 receives the payment card location information before receiving the transaction request. In other embodiments, the FI transaction circuit 222 receives the payment card location information after receiving the transaction request. In some embodiments, the FI transaction circuit 222 receives the payment card location information after requesting the payment card location information from the mobile device 104.

In some embodiments, the FI transaction circuit 222 requests payment card location information based on a variety of factors. For example, the FI transaction circuit 222 may request the payment card location information based on an amount of the transaction request being greater then a threshold amount. For example, if the amount of the transaction is below a threshold amount, the FI transaction circuit 222 may not request payment card location information from the mobile device 104 and instead proceed with other authentication procedures. For example, if a transaction request amount is below five-hundred-dollars, the FI transaction circuit 222 may not request payment card location information from the mobile device 104. In some embodiments, the user of the mobile device 104 may set the threshold value for when authentication procedures based on payment card location information should be required for authenticating a transaction. In another example, the FI transaction circuit 222 requests the payment card location information based on a frequency of received transaction requests being greater then a threshold frequency. For example, if five transaction requests are received by the FI transaction circuit 222 within ten minutes, the FI transaction circuit may request payment card location information from the mobile device 104. The FI transaction circuit 222 may request payment card location information from the mobile device 104 based on a variety of other factors, such as based on a determination that a transaction request may be fraudulent, based on a transaction request be uncharacteristic of the authorized user of the financial account in which funds are to be withdrawn from, as well as any user-defined rule (e.g., based on a certain day of the week, a certain time of day, a particular merchant, a geographic area, etc.).

In some embodiments, if payment card location information is not included in the transaction request (e.g., where the transaction information was prepared in the absence of the payment card 102), the FI transaction circuit 222 may be configured to automatically deny the transaction request. In embodiments where payment card location information is not included in the transaction request, the FI transaction circuit 222 may be configured to request additional authentication information from the customer (e.g., a PIN, answers to one or more security questions, etc.).

In some embodiments, the FI transaction circuit 222 may perform a series of checks that do not involve the payment card 102 before authorizing the transaction request. The FI transaction circuit 222 may perform one or more fraud checks. In addition, the FI transaction circuit 222 may determine whether the transaction request may properly be completed, for example, by determining whether the financial account specified in the transaction request contains sufficient funds to cover the purchase price. In one embodiment, if the transaction request passes a plurality of fraud checks and the underlying transaction may properly be completed, the FI transaction circuit 222 authorizes and completes the transaction request.

In operation according to one embodiment, a customer sets up the mobile wallet circuit 212 on the mobile device 104 and, and uses the mobile wallet circuit 212 in cooperation with the FI wallet circuit 224 to register the payment card 102 and at least one approved method of payment at the financial institution computing system 110. The customer may approach the transaction terminal 106 to purchase a good or service, and tap the mobile device 104 against the terminal I/O 220. The mobile wallet circuit 212 may then prepare transaction information and a payment token. The transaction information may then be transmitted from the mobile I/O 214 to the terminal I/O 220.

The terminal transaction circuit 218 receives and bundles the transaction information with a transaction amount to generate a transaction request. The terminal transaction circuit 218 then transmits the transaction request to the card network computing system 202 over the network 108 via the terminal network circuit 216. The token management circuit 206 receives the transaction request and cooperates with the token vault 208 to detokenize the payment token into a PAN. The token management circuit 206 then includes detokenized payment token information in the transaction request, and transmits the transaction request to the financial institution computing system 110 over the network 108 via the CN network circuit 204.

The FI transaction circuit 222 at the financial institution computing system 110 receives the transaction request via the FI network circuit 228. The FI transaction circuit 222 cooperates with the customer database 226 to authenticate the transaction request using the identified payment card 102, performs a plurality of fraud checks, and determines whether the requested transaction may properly be completed. The FI transaction circuit 222 authorizes the requested transaction, and transmits a confirmation to be received at the terminal transaction circuit 218 over the network 108 (e.g., via the card network computing system 202). The terminal transaction circuit 218 may cause the terminal I/O 220 to provide the customer or a clerk with a visual representation of the confirmation (e.g., a screen on a display, a printed receipt, etc.).

Figure 3:
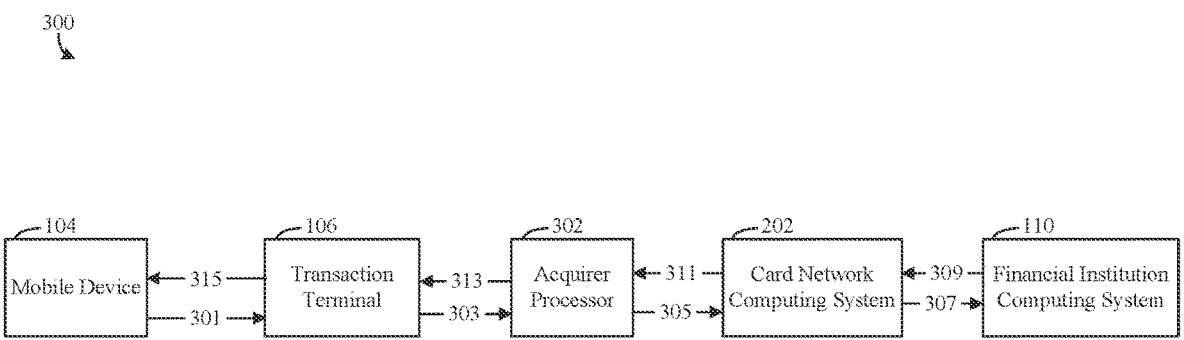
FIG. 3 is a flow diagram of a payment transaction, according to an example embodiment.

FIG. 3 is a flow diagram of a process 300 that may be implemented by the system of FIGS. 1-2. By way of example, FIG. 3 illustrates a mobile wallet transaction. When a user wishes to make a payment at a merchant, for example, the user may access the mobile wallet circuit 212 by entering a PIN or other login credentials and then selecting a "transact" or similar button. For example, the user may be located at a merchant location and may wish to pay for a good or service. As another example, the user may be located away from the merchant location or be engaged in an online transaction.

At step 301, the mobile device 104 may transmit transaction information including a payment token to the transaction terminal 106 (e.g., using a QR code, NFC, wireless, Bluetooth, low energy Bluetooth, RFID, hypersonic, Wi-Fi, cellular 3G, 4G, GSM, LiFi, or other method). In some embodiments, the payment token is provisioned to the mobile wallet circuit 212 in advance and is reused for many mobile wallet transactions. In other embodiments, the payment token is dynamically provisioned to the mobile wallet circuit 212. For example, when the user selects the "transact" button, the mobile wallet circuit 212 may send a request to the FI wallet circuit 224 which, in response, provisions a one-time payment token to the mobile wallet circuit 212. In some embodiments, the payment card 102 provides an identification code to the mobile device 104 for each transaction that is included in the transaction information.

At step 303, after receiving the transaction information, the transaction terminal 106 sends a corresponding transaction request to an acquirer processor computing system 302 for processing. Next, at step 305, the acquirer processor computing system 302 sends the transaction request to the card network computing system 202 for processing a payment. The card network computing system 202 detokenizes the payment token in the transaction request, thereby resulting in the actual card number (i.e., the PAN). At step 307, the card network computing system 202 sends the transaction request and the PAN to the financial institution computing system 110. The financial institution computing system 110 then processes the transaction request, for example, by authenticating the mobile device 104, performing fraud checks, and approving the transaction based on the account status of the user of the mobile device 104 (e.g., by confirming that the user has not exceed the credit limit of their credit card). The financial institution computing system 110 may then send an approval to the transaction terminal 106 via the card network computing system 202, the acquirer processor 112 (steps 309-313), and the payment to the merchant is made. Upon receiving the approval message the transaction terminal 106 may generate a receipt for the user. In some embodiments, the receipt may be sent to the mobile device 104 electronically. In other embodiments, the receipt may be printed physically at the transaction terminal 106.

Figure 4:
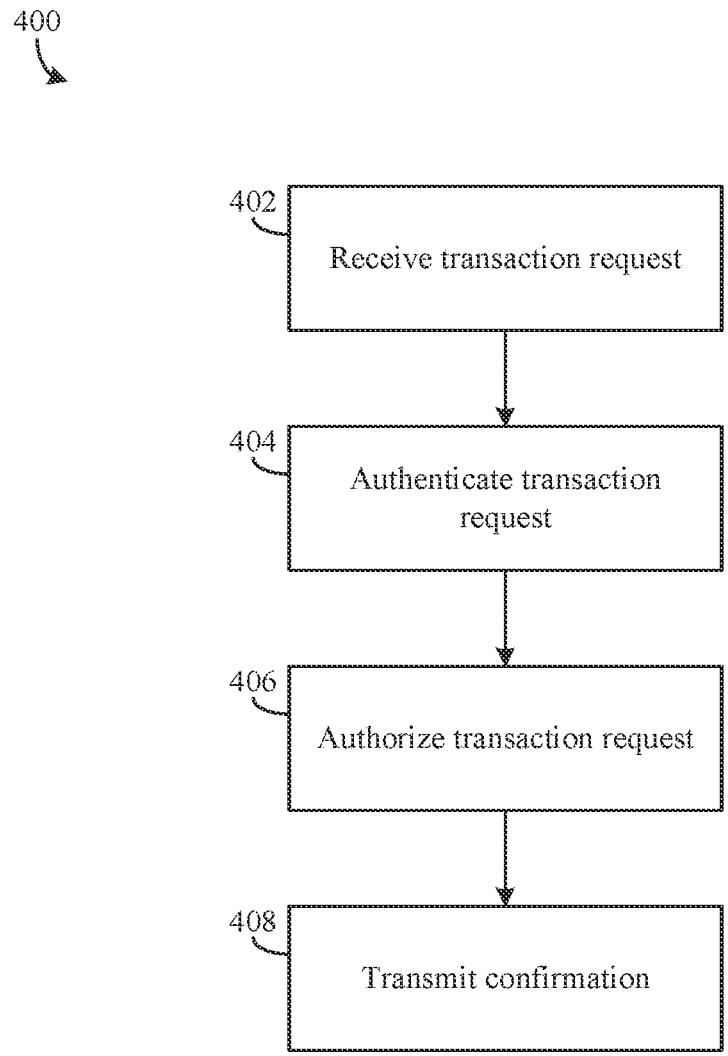
FIG. 4 is a flow diagram of a method of authorizing a transaction request, according to an example embodiment.

Referring now to FIG. 4, a flow diagram of a method 400 of authorizing payment transactions is shown according to an example embodiment. The method 400 may be performed by processing and storage hardware at a financial institution computing system (e.g., the financial institution computing system 110), as executed by one or more circuits configured to perform the functions described below.

At step 402, a transaction request is received. The transaction request is received by an FI transaction circuit (e.g., the FI transaction circuit 222), over a network (e.g., the network 108) via an FI network circuit 228 (e.g., the FI network circuit 228). In various embodiments, the transaction request includes payment credentials and authentication information that includes at least payment card location information corresponding to a payment card (e.g., the payment card 102). The transaction request is assembled at a transaction terminal (e.g., the transaction terminal 106) after communicating with a mobile device (e.g., the mobile device 104) of a customer. The mobile device receives payment card location information from the payment card. A mobile wallet circuit (e.g., the mobile wallet circuit 212) at the mobile device includes the payment card location information with a payment credential (e.g., a payment token) in transaction information, which the mobile wallet circuit transmits to the transaction terminal. The transaction terminal assembles the transaction request using the transaction information (e.g., includes merchant information, a transaction amount, etc. in the transaction request), and transmits the transaction request over the network.

In some embodiments, the transaction request includes a payment token. In some such embodiments, the transaction request is received at a card network computing system (e.g., the card network computing system 202) for detokenization. A token management circuit (e.g., the token management circuit 206) cooperates with a token vault (e.g., the token vault 208) to retrieve a PAN corresponding to the payment token in the transaction request. The token management circuit then updates the transaction request to include the PAN, and transmits the transaction request to the financial institution computing system over the network. As such, in some embodiments, the financial institution computing system receives the transaction request from the card network computing system.

At step 404, the transaction request is authenticated. In some embodiments, the transaction information includes payment card location information, which the FI transaction circuit uses to authenticate the transaction request. Information sufficient to authenticate the transaction request may be stored in a customer database (e.g., the customer database 226) maintained at the financial institution computing system. For example, in some embodiments, if payment card location information is not included in the transaction request, the transaction request may be automatically denied.

At step 406, the transaction request is authorized. The FI transaction circuit may authorize the transaction request after performing one or more checks to determine that the transaction request was not fraudulently made and that the underlying transaction may otherwise be properly completed. In one embodiment, the FI transaction circuit may cooperate with the customer database to determine whether the financial account contains sufficient funds to complete the transaction request. If the FI transaction circuit finds that no fraud indicators are present and that the transaction request may properly be made, the FI transaction circuit may authorize the transaction request (e.g., by causing funds from the financial account associated with the PAN to transfer to a merchant account). Alternatively, if the FI transaction circuit finds one or more fraud indicators, and/or that the transaction request cannot be properly made, the FI transaction circuit may deny the transaction request.

At step 408, a confirmation is transmitted. The FI transaction circuit may prepare the confirmation to include information relating to whether the transaction request was authorized. The FI transaction circuit transmits the confirmation over the network to the transaction terminal, which in some embodiments routes the confirmation to the mobile device.

The embodiments described herein have been described with reference to drawings. The drawings illustrate certain details of specific embodiments that implement the systems, methods, and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input device," as described herein, may include any type of input device or input devices including, but not limited to, a keyboard, a keypad, a mouse, joystick, or other input devices capable of performing a similar function. Comparatively, the term "output device," as described herein, may include any type of output device or output devices including, but not limited to, a computer monitor, printer, facsimile machine, or other output devices capable of performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps, and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described to explain the principals of the disclosure and its practical application to enable one skilled in the art to utilize the various embodiments and with various modifications as are suited to the particular use contemplated. Other substitutions, modifications, changes, and omissions may be made in the design, operating conditions, and embodiment of the embodiments without departing from the scope of the present disclosure as expressed in the appended claims.

What is claimed is:

1. A computing system comprising a processor and a network circuit, configured to:
   receive, over the internet, a request for authorization of a transaction between a mobile application running on a mobile device and a transaction terminal involving a financial account;
   determine, in response to receiving the request for authorization, that a physical card being within a range is required to authorize the transaction;
   in response to determining that the physical card being within the range is required to authorize the transaction, transmit, over the internet via the network circuit, a request to determine whether the physical card is within the range to the mobile device, to cause the mobile device to:
      communicate, via a personal area network created by the mobile device, using a short range wireless communication protocol and a wireless transceiver of the mobile device, to detect that a physical card that corresponds to the financial account is physically located within range of the short range wireless transceiver, the physical card having a microchip;

receive, over the internet from the mobile device, responsive to causing the mobile device to communicate with the microchip of the physical card, an indication of whether the physical card corresponding to the financial account is within range of the short range wireless transceiver; and transmit, over the internet, authorization for the transaction to the transaction terminal when the microchip of the physical card corresponding to the financial account is within the range of the short range wireless transceiver of the mobile device, and otherwise deny the transaction.

2. The computing system of claim 1, wherein the transaction terminal is a merchant computing device, and wherein the processor is configured to receive the request for authorization from the merchant computing device, and transmit the authorization for the transaction to the merchant computing device.

3. The computing system of claim 1, wherein the transaction is an online transaction with a merchant computing device.

4. The computing system of claim 1, wherein the transaction terminal is a merchant transaction terminal, and wherein the transaction is with the merchant transaction terminal.

5. The computing system of claim 1, wherein the physical card is a payment card for making payments from the financial account.

6. The computing system of claim 1, wherein the request for authorization includes a transaction amount, and wherein the processor is configured to determine that the physical card being within the range is required to authorize the transaction based on the transaction amount in the request for authorization exceeding a threshold amount.

7. The computing system of claim 6, wherein the processor is further configured to receive, over the internet from the mobile device, the threshold amount as specified via input to the mobile application running on the mobile device.

8. The computing system of claim 1, wherein the financial account is a first financial account of a user, and wherein the processor is configured to transmit authorization for the transaction upon confirmation that the physical card is associated with at least one of the first financial account and a second financial account of the user.

9. The computing system of claim 1, wherein the financial account is a first financial account at a first financial institution, and wherein the physical card, detected for authorizing the transaction, is configured for making payments from a second financial account at a second financial institution distinct from the first financial institution.

10. The computing system of claim 1, wherein the processor is further configured to:

generate a token for use by the mobile application running on the mobile device in transactions involving the financial account; and provision the token to the mobile application by transmitting, over the internet via the network circuit, the token to the mobile device.

11. The computing system of claim 10, wherein generating the token comprises tokenizing an account number associated with the financial account.

12. The computing system of claim 10, wherein the request for authorization includes the token.

13. The computing system of claim 1, wherein the mobile device communicates with a plurality of physical cards within a wireless range of the mobile device to determine whether the physical card that corresponds to the financial account is detectable.

14. A method comprising:

receiving, over the internet by the computing system, a request for authorization of a transaction between a mobile application running on a mobile device and a transaction terminal involving a financial account;

determining, by the computing system, in response to receiving the request for authorization, that a physical card being within a range is required to authorize the transaction;

in response to determining that the physical card being within the range is required to authorize the transaction, transmitting, over the internet by the computing system, a request to determine whether the physical card is within the range to the mobile device, to cause the mobile device to:

communicate, via a personal area network created by the mobile device, using a short range wireless communication protocol and a wireless transceiver of the mobile device, to detect that a physical card that corresponds to the financial account is physically located within range of the short range wireless transceiver, the physical card having a microchip;

receiving, over the internet by the computing system, from the mobile device, responsive to causing the mobile device to communicate with the microchip of each of the plurality of physical cards, an indication of whether the physical card corresponding to the financial account is within range of the short range wireless transceiver; and transmitting, over the internet by the computing system, authorization for the transaction to the transaction terminal when the microchip of the physical card corresponding to the financial account is within range of the short range wireless transceiver of the mobile device, and otherwise denying the transaction.

15. The method of claim 14, wherein the transaction terminal is a merchant computing device, wherein the request for authorization is received from the merchant computing device, and wherein the authorization for the transaction is transmitted to the merchant computing device.

16. The method of claim 14, wherein the transaction is an online transaction with a merchant computing device.

17. The method of claim 14, wherein the physical card is a payment card for making payments from the financial account.

18. The method of claim 14, wherein the request for authorization includes a transaction amount, and wherein determining that the physical card is required to authorize the transaction is based on the transaction amount in the request for authorization exceeding a threshold amount.

19. The method of claim 14, wherein the financial account is a first financial account of a user, and wherein the authorization for the transaction is transmitted upon confirmation that the physical card is associated with at least one of the first financial account and a second financial account of the user.

20. The method of claim 14, wherein the financial account is a first financial account at a first financial institution, and wherein the physical card, detected for authorizing the transaction, is configured for making payments from a second financial account at a second financial institution distinct from the first financial institution.

* * * * *